US012503222B2

United States Patent
Kim et al.

(10) Patent No.: US 12,503,222 B2
(45) Date of Patent: Dec. 23, 2025

(54) APPARATUS AND METHOD OF PREVENTING GROUND RESONANCE OF AIRCRAFT

(71) Applicants: Hyundai Motor Company, Seoul (KR); Kia Corporation, Seoul (KR)

(72) Inventors: Choung Hyoung Kim, Anyang-Si (KR); Jung Hyun Lee, Gunpo-Si (KR); Eu Gene Hwang, Seongnam-Si (KR)

(*) Notice: Subject to any disclaimer, the term of this patent is extended or adjusted under 35 U.S.C. 154(b) by 156 days.

(21) Appl. No.: 18/595,634

(22) Filed: Mar. 5, 2024

(65) Prior Publication Data
US 2025/0115352 A1    Apr. 10, 2025

(30) Foreign Application Priority Data
Oct. 4, 2023    (KR) .................. 10-2023-0131861

(51) Int. Cl.
*B64C 25/60*        (2006.01)
*B64D 45/00*        (2006.01)

(52) U.S. Cl.
CPC ...... *B64C 25/60* (2013.01); *B64D 2045/0085* (2013.01)

(58) Field of Classification Search
CPC ... B64C 25/60; B64C 25/58; B64C 2025/325; B64C 25/32; B64D 2045/0085; B64D 45/00; F16F 9/535; F16F 9/0227; F16F 9/0281; G01H 1/14
See application file for complete search history.

(56) References Cited

U.S. PATENT DOCUMENTS

| 4,142,698 | A | * | 3/1979 | Niebanck | ............... B64C 25/00 244/104 R |
| 5,242,130 | A | | 9/1993 | Mouille et al. | |

(Continued)

FOREIGN PATENT DOCUMENTS

| CN | 112632695 B | 12/2022 |
| JP | H0788129 B2 | 9/1995 |

(Continued)

OTHER PUBLICATIONS

Yan, Z., Yu, H., Xia, J., Tian B., & Gao, H. (Dec. 2022). LQR-based Ground Resonance Suppression of Helicopter with Adaptive Landing Gear. In 2022 IEEE International Conference on Robotics and Biomimetics (ROBIO) (pp. 692-698). IEEE.

*Primary Examiner* — Donald J Wallace
*Assistant Examiner* — Jalal C Coduroglu
(74) *Attorney, Agent, or Firm* — Banner & Witcoff, Ltd.

(57) ABSTRACT

An apparatus and method of preventing ground resonance of an aircraft, in which ground resonance may be prevented by detecting vibrations caused by rotation of a rotor in the aircraft and adjusting stiffness and damping performance of a landing gear, are provided. The apparatus for preventing ground resonance of an aircraft includes a at least one sensor for monitoring rolling of a fuselage of the aircraft according to rotation of a rotor; a vibration sensing unit installed on the fuselage and detecting vibrations of the fuselage; a damper installed on the fuselage, constituting landing gear, and varying a natural frequency of the fuselage; and a control unit controlling stiffness of the damper based on a phase difference between vibration signals and the rolling of the fuselage.

14 Claims, 5 Drawing Sheets

(56) References Cited

U.S. PATENT DOCUMENTS

| | | | |
|---|---|---|---|
| 6,168,142 B1* | 1/2001 | Bolukbasi | F16F 9/0218 |
| | | | 267/64.11 |
| 10,689,098 B2 | 6/2020 | Waltner | |
| 2007/0032931 A1* | 2/2007 | Makinadjian | B64C 25/60 |
| | | | 701/3 |
| 2010/0237190 A1* | 9/2010 | Mouille | B64C 25/52 |
| | | | 244/108 |
| 2011/0186691 A1 | 8/2011 | Vanni | |
| 2011/0236209 A1 | 9/2011 | Louis et al. | |
| 2013/0248650 A1 | 9/2013 | Gorlich et al. | |
| 2014/0084109 A1* | 3/2014 | Prud'Homme-Lacroix | |
| | | | B64C 25/52 |
| | | | 244/108 |
| 2015/0093245 A1 | 4/2015 | Fuhrer et al. | |
| 2016/0167773 A1* | 6/2016 | Cranga | B64C 25/60 |
| | | | 244/108 |
| 2016/0171700 A1* | 6/2016 | Gauthier | G06T 7/246 |
| | | | 348/144 |
| 2018/0022448 A1* | 1/2018 | Orbon | B64C 27/68 |
| | | | 416/105 |
| 2018/0141644 A1* | 5/2018 | Waltner | B64C 25/60 |
| 2019/0300163 A1 | 10/2019 | Bihel et al. | |
| 2022/0363405 A1* | 11/2022 | Auerbach | B64F 5/60 |
| 2024/0059406 A1* | 2/2024 | Popescu | B64C 27/006 |

FOREIGN PATENT DOCUMENTS

| | | |
|---|---|---|
| JP | H10-226396 A | 8/1998 |
| JP | 5823688 B2 | 11/2015 |
| KR | 101227106 B1 | 2/2013 |
| KR | 10-2013-0108165 A | 10/2013 |
| KR | 10-2015-0030191 A | 3/2015 |
| KR | 10-2019-0114904 A | 10/2019 |
| WO | 2013/152300 A2 | 10/2013 |

\* cited by examiner

APPARATUS AND METHOD OF PREVENTING GROUND RESONANCE OF AIRCRAFT

CROSS-REFERENCE TO RELATED APPLICATION(S)

This application claims benefit of priority to Korean Patent Application No. 10-2023-0131861 filed on Oct. 4, 2023 in the Korean Intellectual Property Office, the disclosure of which is incorporated herein by reference in its entirety.

TECHNICAL FIELD

The present disclosure relates to an apparatus and method of preventing ground resonance of an aircraft, in which ground resonance may be prevented by detecting vibrations caused by rotation of a rotor in the aircraft and adjusting stiffness and damping performance of landing gear.

BACKGROUND

For example, when an aircraft equipped with a rotor is in contact with the ground and the natural frequency of a vibration mode of a fuselage matches the rotation speed of the rotor while waiting for takeoff with the rotor rotating, the vibration mode may be excited by the excitation force from the rotor, causing ground resonance.

Ground resonance is a dangerous condition that may occur any time the rotor rotates while the aircraft is on the ground, and in the worst case, dynamic instability may cause the fuselage to turn sideways (e.g., roll).

To prevent such ground resonance, methods such as changing the damping behavior of the fuselage, changing the damping behavior of the rotor, and the like have been proposed. However, related art technology still does not sufficiently prevent ground resonance, and furthermore, it may be difficult to prevent ground resonance when the payload of the aircraft changes.

SUMMARY

The following summary presents a simplified summary of certain features. The summary is not an extensive overview and is not intended to identify key or critical elements.

Systems, apparatuses, and methods are described for preventing ground resonance of an aircraft. An apparatus for preventing ground resonance of an aircraft may comprise at least one sensor configured to monitor rolling, of a fuselage of the aircraft; a vibration sensor installed on the fuselage and configured to detect vibrations of the fuselage; a damper installed in landing gear of the aircraft and configured to vary a natural frequency of the fuselage; and a controller configured to control a stiffness of the damper based on: a phase difference between vibration signals from the vibration sensor, and the monitored rolling of the fuselage.

Also, or alternatively, a method of preventing ground resonance of an aircraft may comprise: monitoring, based on the aircraft being in contact with a ground via landing gear and based on a rotor of the aircraft rotating, rolling of a fuselage of the aircraft; detecting vibrations of the fuselage; analyzing, based on the fuselage rolling at an angle satisfying a predetermined critical angle, vibration signals based on the detected vibrations; and based on the analyzed vibration signals indicating that ground resonance occurred, increasing a stiffness of a damper of the landing gear.

These and other features and advantages are described in greater detail below.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
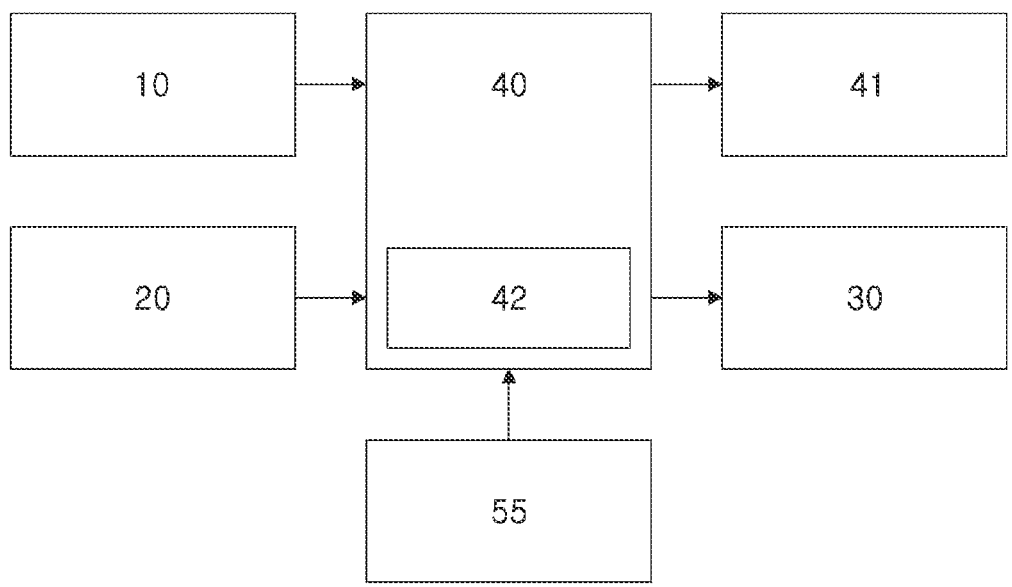
FIG. 1 is a schematic configuration diagram of an apparatus for preventing ground resonance according to an example.

As described above, ground resonance may occur when an aircraft touches the ground (e.g., while waiting for takeoff) with the rotor rotating.

Ground resonance has low-frequency characteristics (e.g., in the frequency range of less than 1 Hz). In this low frequency range, the dynamic behavior of the aircraft fuselage may be mainly determined by the contact between the landing gear and the ground. The stiffness and/or damping performance of the landing gear and the like may affect ground resonance. Accordingly, the most efficient and economical method to solve ground resonance may be to change the stiffness and damping performance of the landing gear.

Hereinafter, the present disclosure will be described in detail with reference to illustrative drawings. When adding reference numerals to components in respective drawings, it should be noted that identical components are given the same reference numerals as much as possible even if they are illustrated in different drawings. Directions referred to herein (e.g., "upper", "lower", "left", "right", "front", "rear", etc.) when used herein will refer to directions based on the orientation of the drawings and are used for ease of explanation, but are not limiting of the subject matter disclosed herein.

Figure 2:
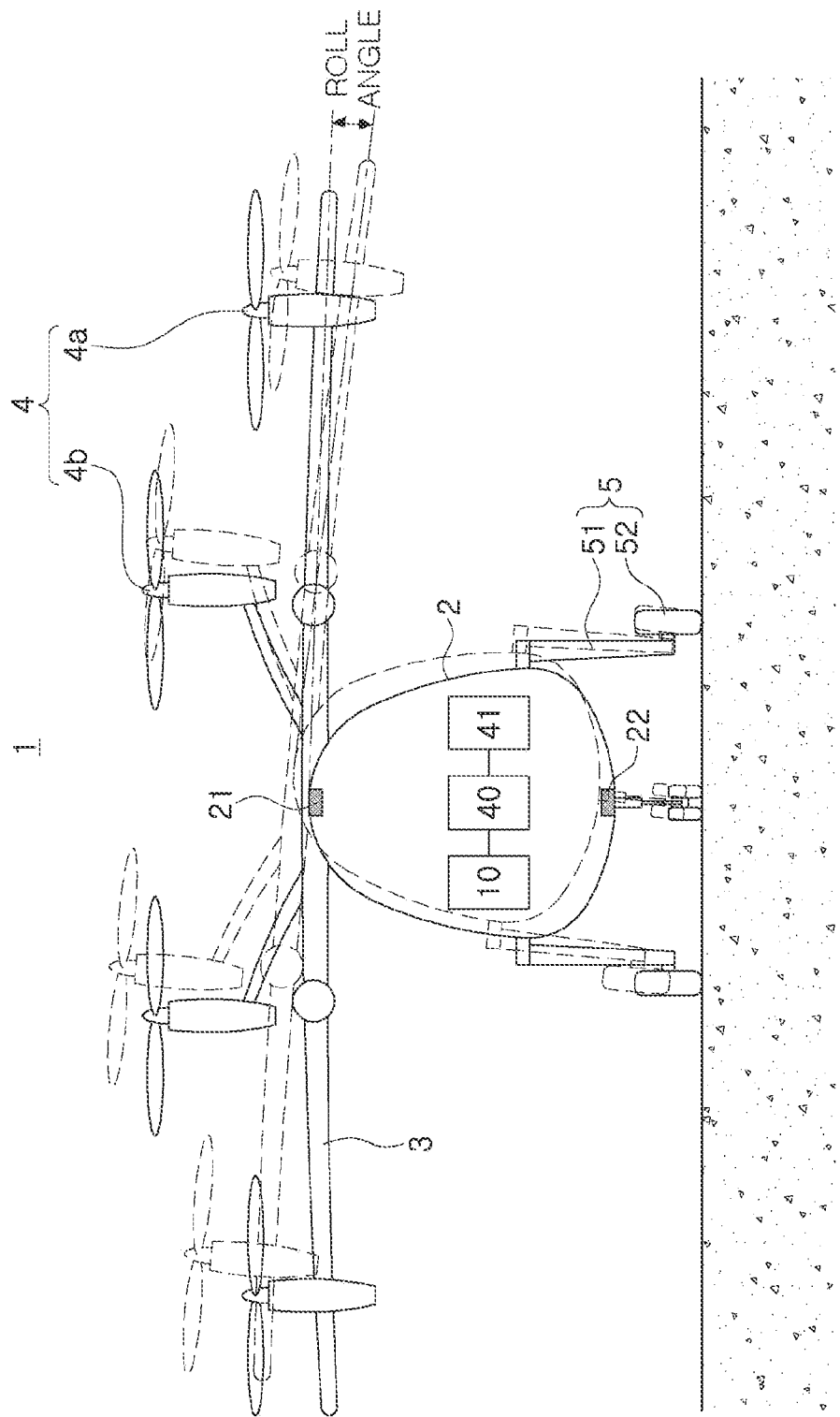
FIG. 2 is a diagram illustrating rolling of a fuselage.

FIG. 1 is a schematic configuration diagram of an apparatus for preventing ground resonance according to an example, and FIG. 2 is a diagram illustrating rolling of a fuselage.

An aircraft 1 may be a mobility vehicle configured to move by flying (e.g., in the sky). For example, "aircraft" as used herein may refer to rotary wing aircraft, drones, tilt rotor aircraft, vertical takeoff and landing aircraft, fixed wing aircraft, or the like, and/or to vehicles that may land on the ground and/or structures using a skid device after flight.

Additionally, or alternatively, the aircraft 1 may include a manned aircraft and/or an unmanned aircraft. A manned aircraft may include a fuselage capable of autonomous flight and/or a fuselage configured to be controlled by a pilot.

For convenience of descriptions, the apparatus for preventing ground resonance according to an the present disclosure will be described and illustrated as an example applied to an aircraft equipped with at least one rotor 4 and a plurality of landing gears 5. However, application examples of the apparatus for preventing ground resonance of the present disclosure are not necessarily limited thereto.

For example, the aircraft 1 may include a fuselage 2 equipped with a boarding space and/or a boarding gate, wings 3 provided on the fuselage, and/or a plurality of rotors 4 provided on the wings.

One or more of the plurality of rotors 4 may be tilting rotors 4a capable of tilting upward or downward for lifting or cruising of the fuselage 2. Also, or alternatively, one or more of the plurality of rotors (e.g., the remainder thereof) may be configured as lifting rotors 4b for lifting of the fuselage.

These rotors 4 may be disposed on the wings 3 (e.g., at least two on each side) on the left and right based on the center of the fuselage 2, but the location and number of rotors are not necessarily limited thereto. In wingless rotorcraft, such as helicopters, at least one rotor may be disposed on the fuselage.

The fuselage 2 may accommodate multiple passengers, and/or the fuselage may capable of vertical takeoff and landing and horizontal cruising.

The aircraft 1 may have the plurality of landing gears 5 installed on the lower portion of the fuselage to support and/or move the fuselage 2 on the ground and/or boarding area.

For example, one landing gear 5 may be disposed in the center of the fuselage 2 (e.g., in the left and right directions) at the front or rear of the aircraft 1, and/or two landing gears 5 may be disposed symmetrically to the left and right of the fuselage, behind and/or in front of the landing gear disposed in the center. For example, the aircraft may be equipped with three landing gears. However, the arrangement and number of landing gears are not limited to the examples described above and illustrated.

Each landing gear 5 may include a support leg 51 installed on (e.g., fixed to, extending/extendable from) the fuselage 2 to be deployed when the aircraft 1 lands or travels, and/or a wheel 52 rotatably mounted on one end of the support leg. The wheel may allow for travel via tires 53 on the ground.

A motor (not illustrated) connected to the wheel 52 and/or driving the wheel may be mounted on the support leg 51 or within the wheel, and thus, the wheel may be driven independently, allowing the fuselage 2 to move and/or travel on the ground.

The apparatus for preventing ground resonance according to an example includes a rolling monitoring unit 10 (e.g., comprising and/or in communication with at least one sensor configured to monitor/detect rolling of the fuselage), a vibration sensing unit 20 (e.g., comprising at least one vibration sensor), a damper 30, and a control unit 40 (e.g., controller).

The rolling monitoring unit 10 may monitor the rolling of the fuselage due to the rotation of the rotor 4, for example, using an inertial navigation system (INS) installed in the fuselage 2 of the aircraft 1. The INS may comprise, for example, the at least one sensor, such as an accelerometer and/or gyro.

The inertial navigation system may be configured to provides navigation information such as the position, speed, and/or attitude of the fuselage 2 based on (e.g., by integrating) acceleration and/or angular velocity measured via at least one sensor. The rolling monitoring unit 10 may determine/calculate the roll angle, pitch angle, and yaw angle based on output from the at least one sensor (e.g., the accelerometer output and gyro output) of the inertial navigation system, and/or may monitor the rolling of the fuselage 2 by (e.g., continuously) detecting changes in the roll angle thereamong.

If the aircraft 1 is in contact with the ground and the rotor 4 is rotating, if the roll angle due to rotation of the rotor is less than a predetermined critical angle (for example, 5 degrees) the rolling monitoring unit 10 continuously detects changes in the roll angle, and when the roll angle changes beyond a predetermined critical angle, for example, 5 degrees or more, the vibration sensing unit 20 determines whether ground resonance has occurred.

The vibration sensing unit 20 is installed on the fuselage 2 and may detect vibration of the fuselage and determine whether ground resonance has occurred by analyzing the frequency characteristics of the vibration signal.

The vibration sensing unit 20 may include a first acceleration sensor 21 mounted on the top of the fuselage 2 and/or configured to detect (e.g., measure) vibrations of the fuselage. A second acceleration sensor 22 mounted on the bottom of the fuselage may be configured to detect vibrations of the fuselage.

The vibration sensing unit 20 may determine whether the phase difference between the vibration signal output from the first acceleration sensor 21 and the vibration signal output from the second acceleration sensor 22 tends to diverge or converge, thereby determining whether ground resonance occurs. If the phase difference of the vibration signals diverges, it may be determined that ground resonance occurs.

Figure 3:
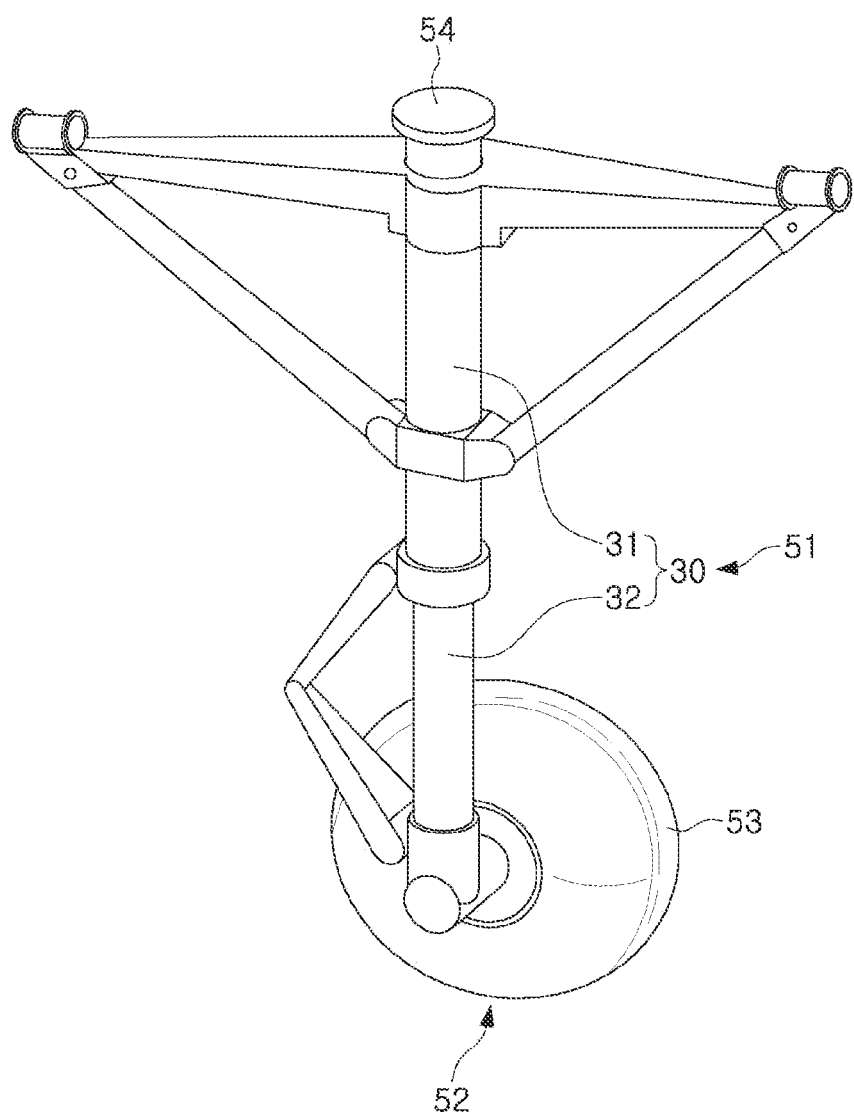
FIG. 3 is a perspective view illustrating landing gear with a damper applied.
Figure 4:
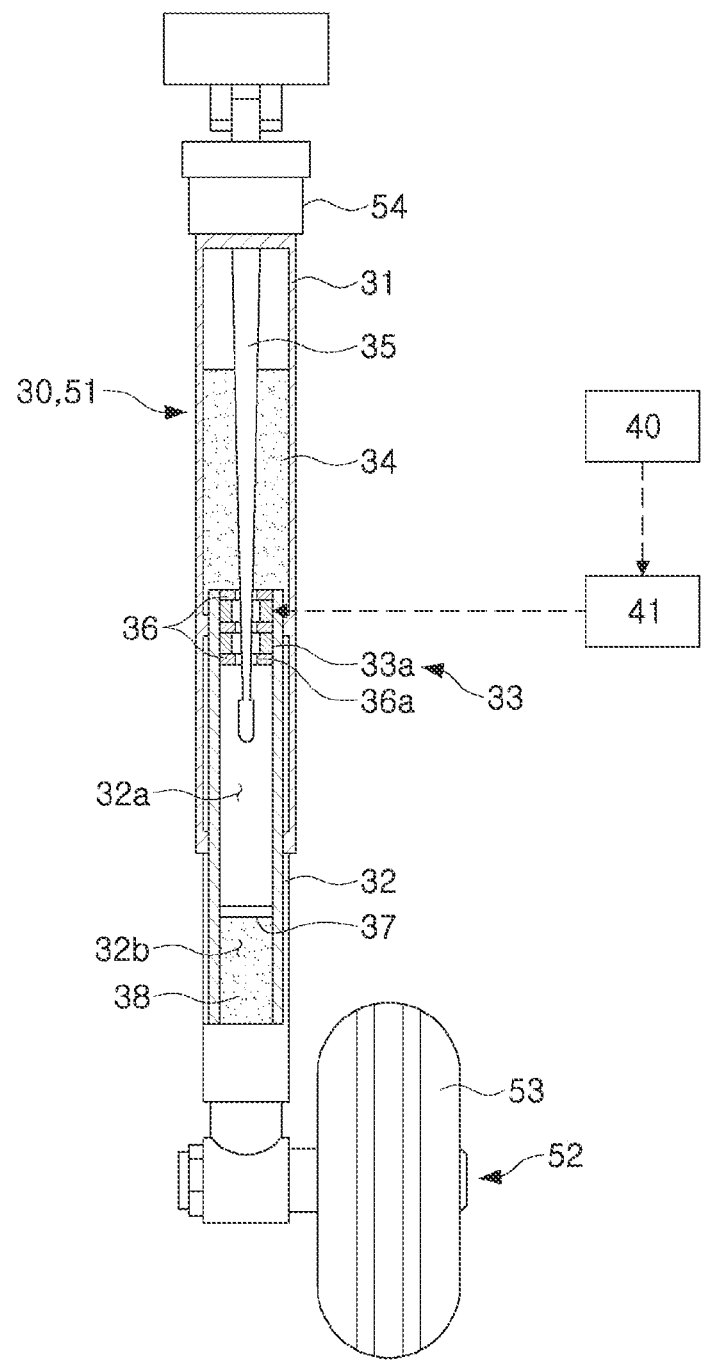
FIG. 4 is a cut-away perspective view illustrating a damper.

FIG. 3 is a perspective view illustrating a landing gear with a damper applied, and FIG. 4 is a cut-away perspective view illustrating the damper.

The damper 30 may be installed on the fuselage 2 (e.g., as part of and/or attached to the landing gear 5). In detail, the support leg 51 of the landing gear may be formed to comprise the damper 30.

The damper 30 may comprise an MR damper configured to change the viscosity of a magnetorheological fluid (MRF) filled inside, depending on the intensity of a current, forming a magnetic field, when power is applied. The MR damper may suppress the vibration of the fuselage 2 and/or allow the natural frequency of the fuselage to vary.

In more detail, the damper 30 may include a cylinder 31, a piston 32, a magnetic force generator 33, and/or a magnetorheological fluid 34.

The cylinder 31 may be formed in the shape of a hollow cylinder with an empty interior, with the lower end open and the upper end closed. The piston 32 may be coupled/couplable to the bottom of the cylinder (e.g., by insertion thereinto), such that the piston may perform a reciprocating linear motion from or into the cylinder. The upper end of the cylinder may be coupled to a mounting portion 54, and/or the mounting portion may be connected to the lower side of the fuselage 2.

The piston 32 may be formed in the shape of a hollow cylinder, with the lower end closed and the upper end open. A portion of the piston may be inserted into the inner diameter of the cylinder 31 to perform the linear reciprocating motion in the axial direction (e.g., into or out of the cylinder 31). Additionally, or alternatively, the lower end of the piston may be coupled with the wheel 52 provided for landing (e.g., on the ground).

Since the piston 32 is configured to reciprocate linearly within the cylinder 31, the damper 30 may be capable of alleviating the shock that the wheels receive from the ground and transmit to the fuselage during the landing of the aircraft 1.

The magnetic force generator 33 may comprise a coil 33a wound in a ring shape on the inner surface of the piston 32. The magnetic force generator may be configured to generate a magnetic field by power applied to the coil. The control unit 40 may control the strength of the magnetic field generated from the coil by controlling the power applied to the coil of the magnetic force generator.

The magnetorheological fluid 34 may be injected into the hollow within the cylinder 31 and the hollow within the piston 32 and/or be able to flow in the space formed therein. The viscosity of this magnetorheological fluid may be changed by the magnetic field generated in the coil 33a of the magnetic force generator 33.

The magnetorheological fluid 34 may be a colloidal liquid in which ferromagnetic or paramagnetic particles are dispersed, and/or may be manufactured with an organic solvent or water. The magnetorheological fluid may be provided with small nanoparticles respectively composed of one selected from the group consisting of magnetite, magnesium, iron, and/or mixtures thereof and/or coated with a surfactant. When nanoparticles are exposed to a strong magnetic field, the nanoparticles become polarized in the colloidal mixture and become oriented/organized into chains of particles in the fluid.

The magnetorheological fluid 34 may selectively change the physical properties of the fluid via the applied magnetic field. Depending on the strength of the magnetic field passing through the magnetorheological fluid, the viscosity may increase and/or a phase change from liquid to solid may occur. Conversely, when the application of the magnetic field is stopped, the magnetorheological fluid may change phase from solid to liquid and/or the viscosity may decrease.

In the damper 30, the strength of the magnetic field may be controlled as needed to control the viscosity of the magnetorheological fluid 34, and the magnetorheological fluid may form a damping force by flowing through the hollow inside the cylinder and the hollow inside the piston by the piston 32, which may reciprocate linearly within the cylinder 31.

The damper 30 may further include a metering pin 35, an orifice portion 36, a separator 37, and/or a buffer fluid 38. These components may be provided to change the damping force of the damper.

The metering pin 35 may be fixed to the lower surface of an upper end of the cylinder 31 and disposed to protrude toward the upper end of the piston 32. The metering pin may have a tapered shape and/or a cone shape with a diameter that decreases from top to bottom (e.g., from where it is fixed to the lower surface of the end of the cylinder 31 towards where it protrudes towards the upper end of the piston 32). Due to the reciprocating linear motion of the piston, the metering pin may be inserted into or withdrawn from the top of the piston.

The orifice portion 36 may be fixedly disposed on the top of the piston 32 so that the metering pin 35 may be inserted and/or penetrate into the orifice portion 36. The orifice portion 36 may comprise a plate shaped portion with a hole 36a. Due to the reciprocating linear motion of the piston, the metering pin disposed in the cylinder 31 may be inserted into and/or withdrawn from the hole 36a of the orifice portion 36 disposed on the top of the piston.

The diameter or width of the hole 36a is formed to be larger than the diameter or width of the metering pin 35, and as the tapered metering pin is inserted or uninserted, the gap between the hole and the metering pin changes.

When the piston 32 is inserted into the cylinder 31, the pressure inside the cylinder 31 becomes higher relative to the pressure inside the piston 32, and as a result, the magnetorheological fluid 34 filled in the cylinder 31 moves inside the piston 32 through the gap between the hole 36a and the metering pin 35.

The gap size between the hole 36a and the metering pin 35 varies depending on the position of the metering pin according to the relative movement of the piston 32. The flow rate of the magnetorheological fluid 34 passing through the gap and the pressure received by the magnetorheological fluid may vary.

If the piston 32 of the damper 30 is inserted into the cylinder 31, the pressure inside the cylinder may increase. As the gap between the hole 36a and the metering pin 35 narrows (e.g., as the metering pin is inserted further into the piston 32), the magnetorheological fluid 34 passing therethrough may be subject to greater pressure. As the damping force increases, shocks applied from the outside may be attenuated to a greater degree.

Conversely, as the piston 32 comes out of the cylinder 31, the pressure inside the cylinder becomes lower relative to the pressure inside the piston, and the gap between the hole 36a and the metering pin 35 widens, so the magnetorheological fluid 34 may move more easily into the cylinder 31 through the gap.

The separator 37 may be disposed in the middle of the inside of the piston 32 to divide the inside of the piston into a first space 32a and a second space 32b. The separator may have a plate shape and may move inside the piston.

The first space 32a may be filled with the magnetorheological fluid 34 moved from the cylinder 31, and the second space 32b may be filled with the buffer fluid 38 capable of buffering. In this case, the buffer fluid may include a compressible fluid, and in detail, may be formed of air or nitrogen.

When the piston 32 is inserted into the cylinder 31 due to factors such as external force or impact, the magnetorheological fluid 34 in the cylinder moves inside the piston, and the pressure inside the piston increases, and as a result, the separator 37 is moved to one side, for example, toward the second space 32b to transmit the pressure. Ultimately, the buffer fluid 38 receives the pressure.

When the shock received by the wheel 52 from the ground during landing of the aircraft 1 is transmitted to the damper 30 configured as described above, the piston 32 moves into the cylinder 31 and the damper contracts, and first, as the magnetorheological fluid 34 moves, a damping force is formed.

In addition, according to the pressure increased by the magnetorheological fluid 34 introduced into the piston 32, the separator 37 is moved toward the second space 32b, and as the buffer fluid 38 is secondarily compressed, a damping force is formed.

Moreover, as described above, when the magnetic force generator 33 generates a magnetic field, the viscosity of the magnetorheological fluid 34 changes, and as the viscosity increases, the damping force of the cylinder 31 and the piston 32, for example, the damper 30, may increase.

Optionally, to control the magnetic field, the damper 30 may further include a load sensor and/or a pressure sensor, not illustrated.

The load sensor may be interposed between the top of the cylinder 31 and the mounting portion 54 to measure the load of the aircraft 1. This load may be used to calculate damping force. Additionally, or alternatively, the load sensor may measure the force that the wheel 52 receives from the ground and transmits to the fuselage 2 during landing or driving.

The pressure sensor may be installed in the cylinder and/or may measure the pressure within the cylinder that changes according to the movement of the piston 32 and the magnetorheological fluid 34. This pressure may be used to calculate an impulse degree.

The load sensor and the pressure sensor may be electrically/communicatively connected to the control unit 40 and/or may transmit the corresponding measured values. The control unit 40 may transmit a control signal to a power source 41 such that the intensity of the current applied to the coil 33*a* of the magnetic force generator 33 may be controlled according to the input measurement value.

For example, when the aircraft 1 lands, the control unit 40 may receive a measured value of the impact associated with landing from the load sensor and/or the pressure sensor and controls the power source 41 to apply the power to the coil 33*a*, to not only generate a magnetic field in the magnetic force generator 33, but also control the strength of the magnetic field. As a result, the viscosity of the magnetorheological fluid 34 may be adjusted and the damping force of the damper 30 may be increased.

The landing gear 5 to which the damper 30 is applied may comprise and/or only be composed of the cylinder 31, the piston 32, the metering pin 35, the orifice portion 36, the separator 37, the buffer fluid 38, and the like, thereby obtaining damping force, and may obtain additional changes in damping force by changing the viscosity of the magnetorheological fluid 34 as needed, thereby securing stable performance when landing the aircraft.

In the apparatus for preventing ground resonance according to an example, when ground resonance occurs while the aircraft 1 is in contact with the ground and the rotor 4 is rotating, the function of the magnetic force generator 33 and the magnetorheological fluid 34 of the damper 30 of the landing gear 5 having the above-described configuration and operating relationship is used.

To this end, the control unit 40 is electrically connected to the rolling monitoring unit 10, the vibration sensing unit 20, and the power source 41, and when it is determined that ground resonance occurs due to the phase difference of the vibration signals diverging from the vibration sensing unit, the control unit controls the viscosity of the magnetorheological fluid 34 to change by applying power from the power source to the coil 33*a* in the magnetic force generator 33 of the damper 30. Accordingly, the vibration of the landing gear 5 and the fuselage 2 may be controlled along with the stiffness of the damper.

In detail, the control unit 40 may include a plurality of electrical and electronic components that provide power to the coil 33*a* of the magnetic force generator 33. For example, the control unit may be implemented with various programmable processing units, such as a microprocessor with a built-in semiconductor chip or memory capable of performing various operations or commands. For example, the control unit may be merged with the upper control system of the aircraft 1 or used concurrently.

The control unit 40 may transmit a control signal regarding the application or interruption of power necessary for generating the magnetic field of the magnetic force generator 33 to the power source 41 through a communication link. As a communication link, for example, wireless communication such as a local area network may be employed, but it is not necessarily limited thereto, and wired, wired/wireless, or optical communication may also be applied.

A battery may be employed as the power source 41, and/or the power source 41 may be electrically connected to respective components of the aircraft 1 to supply electricity. These batteries may be of various types, such as lithium-ion batteries and all-solid-state batteries.

Additionally, or alternatively, the control unit 40 may include a timer 42 and obtain time data from the timer. For example, when the phase difference between vibration signals does not converge even after a certain period of time has elapsed, the control unit may stop the stiffness control of the damper 30 and may also stop the operation of the rotor 4.

Each landing gear 5 may include a touch sensor 55 configured to generate a weight on wheel (WOW) signal of the aircraft 1. The touch sensor may be electrically and/or communicatively connected to the control unit 40, and/or allow the control unit to determine whether the aircraft 1 is in the air or on the ground based on the WOW signal.

For example, if the aircraft 1 is on the ground, about to take off, and/or lands, the touch sensor 55 may apply a WOW signal which may enable the control unit 40 to recognize that the aircraft is on the ground. Conversely, in the air, the touch sensor may not apply the WOW signal, which may indicate to the control unit 40 that the aircraft is off the ground.

The control unit 40 may control the power supply from the power source 41 according to a divergence information signal received from the vibration sensing unit 20. The control unit 40 may control the power supply to apply the magnetic field generated by the magnetic force generator 33 to the magnetorheological fluid 34 and/or to stop the application of the magnetic field.

For example, if a signal received, by the control unit 40 from the vibration sensing unit 20, is a divergence information signal of the phase difference that indicates that ground resonance has occurred and/or is occurring, the control unit 40 may control the power source so that power is applied from the power source 41 to the magnetic force generator 33.

The control unit 40 may control the power to adjust the intensity of the current applied to the coil 33*a* of the magnetic force generator 33 in accordance with the divergence information signal received from the vibration sensing unit 20.

As the strength of the magnetic field passing through the magnetorheological fluid 34 increases, the viscosity of the magnetorheological fluid may increase, and the magnetorheological fluid may change phase from liquid to solid. As a result, the stiffness of the damper 30 may increase, thereby improving the damping force and/or suppressing the vibration of the landing gear 5 and/or the fuselage 2.

In this manner, according to the apparatus for preventing ground resonance according to an example, the phenomenon of ground resonance may be prevented and vibration may be reduced, thereby increasing the lifespan of the aircraft fuselage, and providing an effect of reducing maintenance costs.

While the aircraft 1 is flying from its origin to its destination, the causes of stress for passengers vary from unexpected weather, flight environments, mechanical defects of the aircraft, to personal problems unrelated to the flight. In this case, the flight environment includes stress factors such as noise and vibrations.

Looking at passenger stress at each stage of the flight, stress may increase during takeoff and landing of the aircraft, and stress decreases during the cruising section, unlike takeoff and landing. In detail, it can be seen that passenger stress is highest during the takeoff and landing sections.

According to the apparatus for preventing ground resonance according to an example, by reducing vibration of the landing gear and fuselage, the fear or stress caused by vibration, felt by passengers, when preparing for takeoff from the ground may be reduced and comfort may be improved.

Figure 5:
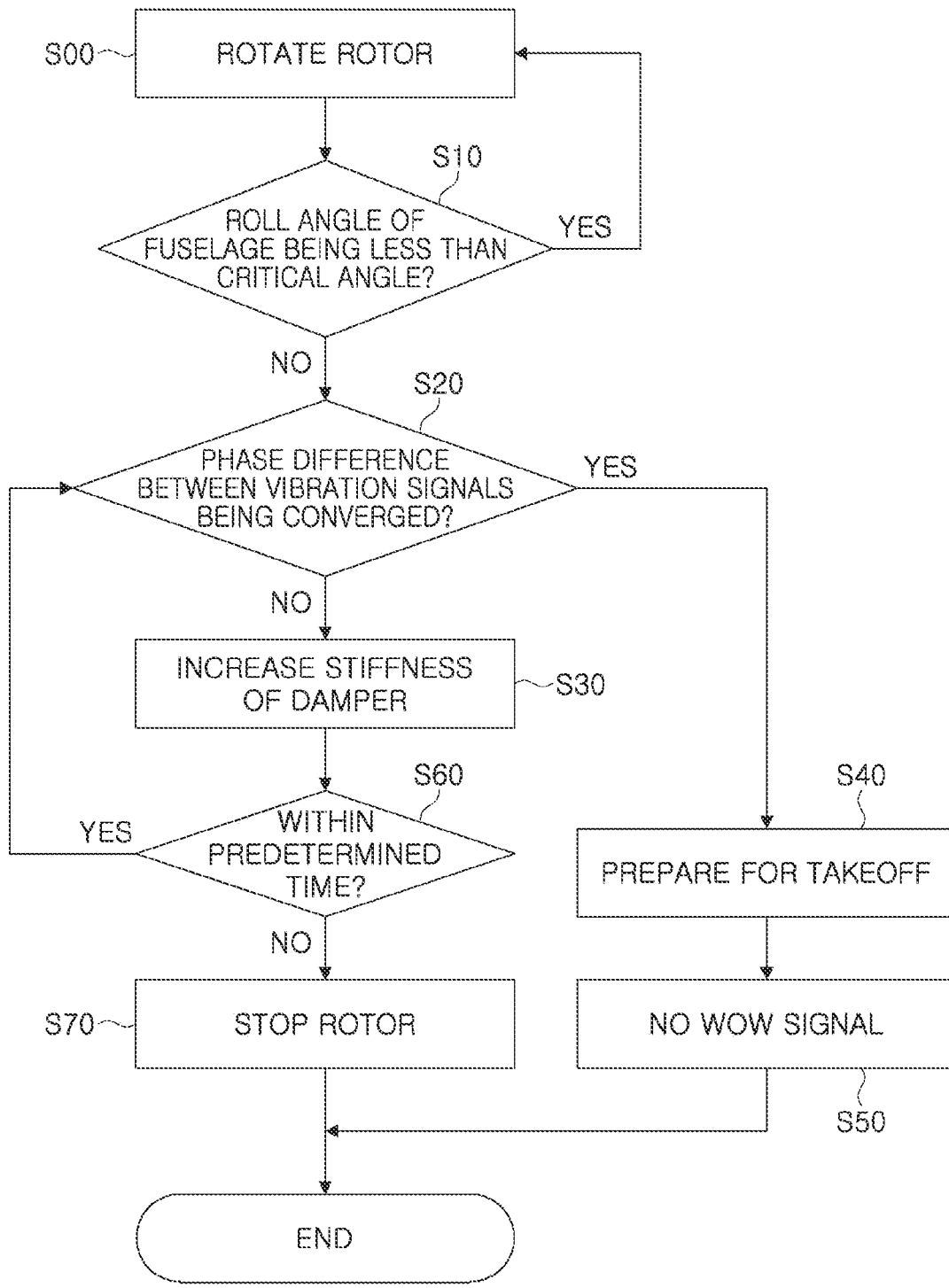
FIG. 5 is a flowchart illustrating a method of preventing ground resonance according to an example.

FIG. 5 is a flowchart illustrating a method of preventing ground resonance according to an example.

The method of preventing ground resonance according to an example may include monitoring whether the fuselage 2 of the aircraft is rolling (S10) while the aircraft 1 is in contact with the ground via the landing gear 5 and the rotor 4 rotates (S00); detecting vibration of the fuselage and analyzing the vibration signal (S20) when the fuselage rolls by a predetermined critical angle or more; and increasing the stiffness of the damper 30 constituting the landing gear (S30) when it is determined that ground resonance occurs by analyzing the vibration signal.

The rolling monitoring unit 10 may calculate a roll angle, a pitch angle, and a yaw angle from the accelerometer output and the angular velocity (gyro) output of the inertial navigation system installed in the fuselage 2 of the aircraft 1 and may monitor the rolling of the fuselage due to the rotation of the rotor 4 by continuously detecting changes in the roll angle thereamong.

With the aircraft 1 in contact with the ground and the rotor 4 rotating (S00), whether the roll angle due to the rotation of the rotor is less than a predetermined critical angle, for example, 5 degrees, may be checked/determined. If the roll angle is less than a predetermined critical angle, the rolling monitoring unit 10 may monitor the rolling of the fuselage 2 by continuously detecting changes in the roll angle (S10).

If the roll angle changes to satisfy (e.g., meet and/or exceed) a predetermined critical angle (e.g., 5 degrees or more) the vibration sensing unit 20 may analyze the frequency characteristics of the vibration signal to determine whether ground resonance has occurred.

The vibration sensing unit 20 may determine whether the phase difference between the vibration signals output from the first acceleration sensor 21 and the second acceleration sensor 22 tends to diverge or converge, and determine whether ground resonance occurs (S20). In detail, when the phase difference of the vibration signals diverges, it may be determined that ground resonance occurs.

When a divergence information signal of the phase difference that determines that ground resonance occurs is received from the vibration sensing unit 20, the control unit 40 may control the power source so that power is applied from the power source 41 to the coil 33*a* in the magnetic force generator 33 of the damper 30.

At this time, the control unit 40 may control the power source 41 to adjust the intensity of the current applied to the coil 33*a* of the magnetic force generator 33 in the damper 30 constituting the landing gear 5, to correspond to the divergence information signal received from the vibration sensing unit 20.

As the strength of the magnetic field passing through the magnetorheological fluid 34 increases, the viscosity of the magnetorheological fluid increases, thereby increasing the stiffness of the damper 30 and improving the damping force (S30).

If the vibration sensing unit 20 determines that the phase difference of the vibration signals converges (e.g., indicating no ground resonance occurs), the control unit 40 may prepare for takeoff of the aircraft 1 (S40). If the WOW signal is not applied from the touch sensor 55 of the landing gear 5, the control unit may recognize that the aircraft has taken off and is in the air (S50). Accordingly, control to prevent ground resonance may be terminated.

In this case, the WOW signal indicates that when the wheel 52 of the landing gear 5 is in contact with the ground, the load of the aircraft 1 is applied to the wheel and the touch sensor 55 is turned on, indicating that the aircraft is on the ground. Additionally, or alternatively, if the aircraft takes off and/or is in the air, the load on the wheels may disappear and the touch sensor may turn off and/or detect the reduced load, indicating that the aircraft is in flight.

The control unit 40 may use the timer 42 to check whether it is within a predetermined time, for example, 20 seconds, from a first time when the vibration sensing unit 20 analyzed the frequency characteristics of the vibration signal and determined whether ground resonance occurred. If it is within the predetermined time, the control to prevent ground resonance may be continued (S60).

The control unit 40 may control the stiffness of the damper 30 to increase for a predetermined period of time, for example, 20 seconds. If the divergence information signal of the phase difference continues to be received and the predetermined time elapses, the control unit 40 may stop the stiffness control of the damper and/or stop the operation of the rotor 4 (S70).

The control unit 40 may end the control to prevent ground resonance and/or protect passengers and/or cargo by preventing accidents in the aircraft due to such resonance.

The apparatus for preventing ground resonance, according to an example as described herein, may prevent and/or reduce the phenomenon of ground resonance and/or vibration, thereby increasing the lifespan of the aircraft fuselage and/or reducing maintenance costs.

An aspect of the present disclosure is to provide an apparatus and method of preventing ground resonance of an aircraft, in which ground resonance may be prevented by detecting vibrations caused by rotation of a rotor in the aircraft and adjusting stiffness and damping performance of landing gear.

According to an aspect of the present disclosure, an apparatus for preventing ground resonance of an aircraft includes a rolling monitoring unit (e.g., comprising and/or in communication with at least one sensor) for monitoring rolling of a fuselage of the aircraft according to rotation of a rotor; a vibration sensing unit (e.g., at least one vibration sensor) installed on the fuselage and detecting vibrations of the fuselage; a damper installed on the fuselage, constituting landing gear, and varying a natural frequency of the fuselage; and a control unit (e.g., controller) for controlling stiffness of the damper based on a phase difference between vibration signals and the rolling of the fuselage.

The damper may include a cylinder having a hollow shape; a piston having a hollow shape, partially inserted into the cylinder and configured to have a reciprocating linear motion; a magnetic force generator disposed on one side of the piston and having a coil wound therearound to generate a magnetic field when power is applied thereto; and a magnetorheological fluid injected and flowing inside the cylinder and the piston, and having viscosity changing due to the magnetic field generated by the coil.

The damper may further include a metering pin fixed to a lower surface of an upper end of the cylinder, protruding toward an upper end of the piston, and having a tapered shape; an orifice portion fixed to the upper end of the piston, having a hole allowing the metering pin to be inserted thereinto and to penetrate therethrough, and allowing the magnetorheological fluid to flowing through a gap between the hole and the metering pin; and a separator movably disposed inside the piston and dividing the inside of the piston into a first space and a second space. The first space may be filled with the magnetorheological fluid moved from the cylinder, and the second space may be filled with a buffer fluid capable of buffering.

The control unit may be electrically connected to the rolling monitoring unit, the vibration sensing unit and a power source, may apply power from the power source to the coil to generate a magnetic field in the magnetic force generator when it is determined that ground resonance occurs, and may control the stiffness of the damper and the vibrations of the fuselage by changing the viscosity of the magnetorheological fluid.

The rolling monitoring unit may monitor the rolling of the fuselage by continuously detecting a roll angle of the fuselage using an inertial navigation system installed in the fuselage.

The vibration sensing unit may include a first acceleration sensor mounted on an upper end of the fuselage and detecting the vibrations of the fuselage, and a second acceleration sensor mounted on a lower end of the fuselage and detecting the vibrations of the fuselage.

The vibration sensing unit may determine whether the ground resonance occurs by determining whether a phase difference between a vibration signal output from the first acceleration sensor and a vibration signal output from the second acceleration sensor diverges or converges.

The control unit may include a timer, and the control unit may stop an operation of the rotor when the phase difference between the vibration signals does not converge after a predetermined time has elapsed.

According to an aspect of the present disclosure, a method of preventing ground resonance of an aircraft includes monitoring whether a fuselage of the aircraft is rolling when the aircraft is in contact with a ground via landing gear and a rotor is rotating; detecting vibrations of the fuselage and analyzing a vibration signal when the fuselage rolls at a predetermined critical angle or more; and increasing stiffness of a damper constituting the landing gear when it is determined that the ground resonance occurs by analyzing the vibration signal.

The monitoring the rolling of the fuselage may include detecting a roll angle of the fuselage using an inertial navigation system, and continuously detecting when the roll angle is less than the critical angle.

The analyzing the vibration signal may include determining whether a phase difference between vibration signals output from a first acceleration sensor mounted on an upper end of the fuselage and a second acceleration sensor mounted on a lower end of the fuselage diverges or converges, and determining that the ground resonance occurs when the phase difference between the vibration signals diverges.

The damper may include a magnetic force generator provided with a coil wound therearound to generate a magnetic field when power is applied thereto from a power source; and a magnetorheological fluid having viscosity changing due to the magnetic field generated in the magnetic force generator. The increasing the stiffness of the damper may include changing the viscosity of the magnetorheological fluid by controlling the power source to apply the power to the coil.

The method of preventing ground resonance of an aircraft may further include preparing the aircraft for takeoff if it is determined that the ground resonance does not occur; and terminating control to prevent the ground resonance if a Weight-On-Wheel (WOW) signal is not applied (e.g., ceases).

The method of preventing ground resonance of an aircraft may further include stopping an operation of the rotor when a predetermined time has elapsed from a first time at which it is determined whether the ground resonance has occurred by analyzing the vibration signal.

As set forth above, according to an example, the phenomenon of ground resonance may be prevented and vibrations may be reduced, thereby increasing a lifespan of an aircraft fuselage and reducing maintenance costs.

Reducing vibrations may reduce fear and/or stress felt by passengers and caused by vibrations, such as when preparing for takeoff from the ground, and improving comfort.

While examples have been illustrated and described above, it will be apparent to those skilled in the art that modifications and variations could be made without departing from the scope of the present disclosure as defined by the appended claims.

What is claimed is:

1. An apparatus for preventing ground resonance of an aircraft, comprising:
   at least one sensor configured to monitor rolling, of a fuselage of the aircraft;
   a vibration sensor installed on the fuselage and configured to detect vibrations of the fuselage;
   a damper installed in landing gear of the aircraft and configured to vary a natural frequency of the fuselage; and
   a controller configured to control a stiffness of the damper based on:
      a phase difference between vibration signals from the vibration sensor, and
      the monitored rolling of the fuselage.

2. The apparatus of claim 1, wherein the damper comprises,
   a cylinder having a hollow shape;
   a piston, having a hollow shape, configured to be partially inserted into a first end of the cylinder and to move in a reciprocating linear motion relative to the cylinder;
   a magnetic force generator disposed on the piston and comprising a coil wound to generate, based on application of power to the coil, a magnetic field within the piston; and
   a magnetorheological fluid inside the cylinder and the piston, having viscosity configured to change based on the magnetic field generated by the coil.

3. The apparatus of claim 2, wherein the damper further comprises,
   a metering pin fixed to a second end of the cylinder and protruding toward the first end, of the cylinder, and toward an end of the piston inserted into the cylinder, wherein the metering pin has a tapered shape that tapers away from the second end of the cylinder;
   an orifice portion fixed to the end of the piston, wherein a hole formed in the orifice portion is configured to:
      accept insertion of the metering pin thereinto, and
      allow the magnetorheological fluid to flow through a gap between the hole and the metering pin; and
   a separator movably disposed inside the piston to divide an internal space of the piston into a first space and a second space,
   wherein the first space is filled with the magnetorheological fluid moved from the cylinder, and
   the second space is filled with a buffer fluid.

4. The apparatus of claim 2, wherein the controller is communicatively connected to the at least one sensor, the vibration sensor and a power source, and is configured to:

based on a determination that ground resonance has occurred, apply power from the power source to the coil to cause the magnetic force generator generate a magnetic field in the magnetic force generator to change the viscosity of the magnetorheological fluid so as to control the stiffness of the damper and the vibrations of the fuselage.

5. The apparatus of claim 1, wherein the at least one sensor is configured to monitor the rolling of the fuselage by continuously detecting, based on data from an inertial navigation system installed in the fuselage, a roll angle of the fuselage.

6. The apparatus of claim 1, wherein the vibration sensor comprises,
a first acceleration sensor configured to detect vibrations, of the fuselage, at a first location on the fuselage, and
a second acceleration sensor configured to detect vibrations, of the fuselage, at a second location on the fuselage.

7. The apparatus of claim 6, wherein the vibration sensor is configured to determine, based on whether a phase difference between a first vibration signal, output from the first acceleration sensor, and a second vibration signal, output from the second acceleration sensor, converges, whether ground resonance occurred.

8. The apparatus of claim 7, wherein the controller comprises a timer, and
wherein the controller is configured to stop, based on the phase difference not converging after a predetermined time has elapsed, an operation of a rotor or the aircraft.

9. A method of preventing ground resonance of an aircraft, the method comprising:
monitoring, based on the aircraft being in contact with a ground via landing gear and based on a rotor of the aircraft rotating, rolling of a fuselage of the aircraft;
detecting vibrations of the fuselage;
analyzing, based on the fuselage rolling at an angle satisfying a predetermined critical angle, vibration signals based on the detected vibrations; and
based on the analyzed vibration signals indicating that ground resonance occurred, increasing a stiffness of a damper of the landing gear.

10. The method of claim 9, wherein the monitoring the rolling of the fuselage comprises detecting, based on data from an inertial navigation system, a roll angle of the fuselage and determining whether the roll angle satisfies the predetermined critical angle.

11. The method of claim 9, wherein the analyzing the vibration signals comprises determining whether a phase difference between a first vibration signal, of the vibration signals and output by a first acceleration sensor mounted at a first location on the fuselage, and a second vibration signal, of the vibration signals and output by a second acceleration sensor mounted at a second location on the fuselage, diverges or converges, wherein the analyzed vibration signals diverging indicate that the ground resonance occurred.

12. The method of claim 9, wherein the damper comprises,
a magnetic force generator comprising a coil wound to generate, based on application of a power from a power source, a magnetic field; and
a magnetorheological fluid having viscosity configured to change based on the magnetic field generated by the magnetic force generator, wherein the increasing the stiffness of the damper comprises controlling the power source to apply the power to the coil to change the viscosity of the magnetorheological fluid.

13. The method of claim 9, further comprising:
based on a determination that the ground resonance is not occurring, preparing the aircraft for takeoff; and
based on a Weight-On-Wheel (WOW) signal not being received, terminating control to prevent the ground resonance.

14. The method of claim 9, further comprising, based a predetermined time elapsing from a first time at which the analyzed vibration signals indicated that the ground resonance occurred, stopping an operation of the rotor.

* * * * *